(12) United States Patent
Muramatsu et al.

(10) Patent No.: US 6,575,275 B2
(45) Date of Patent: Jun. 10, 2003

(54) RATCHET ONE-WAY CLUTCH

(75) Inventors: Kazuhiko Muramatsu, Fukuroi (JP); Hirofumi Ogata, Kakegawa (JP); Hirobumi Shirataki, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/891,320

(22) Filed: Jun. 27, 2001

(65) Prior Publication Data

US 2002/0005327 A1 Jan. 17, 2002

(30) Foreign Application Priority Data

Jun. 30, 2000 (JP) ........................................ 2000-197482

(51) Int. Cl.[7] ........................ F16D 41/069; F16H 45/00
(52) U.S. Cl. ..................... 192/3.21; 60/345; 192/46; 192/212
(58) Field of Search ............................ 192/46, 55.61, 192/212, 64, 205, 3.21; 188/82.7, 82.77; 60/345

(56) References Cited

U.S. PATENT DOCUMENTS

| 1,939,226 A | * | 12/1933 | Rauen | 192/55.61 |
| 2,082,129 A | * | 6/1937 | Van Ranst | 192/55.61 |
| 1,935,459 A | * | 11/1939 | Ryan et al. | 192/212 |
| 2,613,785 A | * | 10/1952 | Mohns | 192/212 |
| 4,620,621 A | * | 11/1986 | Kulczycki et al. | 192/212 |
| 5,947,245 A | * | 9/1999 | Costin et al. | 192/46 |
| 6,419,068 B1 | * | 7/2002 | Stephan et al. | 192/219.5 |

* cited by examiner

Primary Examiner—Rodney H. Bonck
(74) Attorney, Agent, or Firm—Miles & Stockbridge P.C.

(57) ABSTRACT

A ratchet one-way clutch comprises an inner race provided with recessed portions on the outer circumference; an outer race member arranged coaxially with the inner race, being provided with pockets on the inner circum-ferential side; a pawl member arranged for each of the pockets to transmit torque by being fitted into each of the recessed portions; and a biasing member for biasing the pawl member in the inner diametral direction to promote the fitting. For this clutch, an operating element is provided to relatively rotate with respect to the outer race member, and an elastic member resides inclusively between the outer race member and the operating element.

6 Claims, 4 Drawing Sheets

RATCHET ONE-WAY CLUTCH

BACKGROUND OF THE INVENTION

1. Field of the Invention

The present invention relates to a transmission used for automobiles, agricultural machinery, construction machinery, and industrial machinery, among some others. More particularly, the invention relates to the ratchet one-way clutch that uses ratchet (pawl member) for a lock mechanism, among the one-way clutches used for an automatic transmission or the like adopted for vehicles to carry out the function of back stop or the like. More specifically, the invention relates to a ratchet one-way clutch provided with means for reducing the dragging torque of bearing.

2. Related Background Art

In general, the one-way clutch used for the automatic transmission is provided with the outer race and inner race that rotate relatively, and arranged to transmit the rotational torque only in one direction by allowing the sprag, roller, and others, which transmit the torque between the outer and inner races, to engage with the surface of a cam provided for the raceway surface of the outer race or the inner race. Also, the structure is arranged so that the clutch makes idle rotation in the reverse direction.

Of the one-way clutches thus arranged, there is the ratchet one-way clutch that uses the ratchet as a torque transmission member that transmits torque between the outer and inner races. The ratchet one-way clutch comprises the outer race with pockets on the inner circumference thereof; the inner race with notches on the outer circumference thereof arranged coaxially with the outer race; the pawl member that transmits torque between the inner and outer races in a state of being engaged with each notch of the inner race housed in the pocket so as to lock the one-way clutch; and the elastic member such as a spring that biases the pawl member to the inner race.

The pawl member of the ratchet one-way clutch thus structured is made slidable freely on the outer circumference of the inner race when the one-way clutch rotates in one direction, thus enabling the outer race and inner race to relatively rotate idly. Then, when the one-way clutch begins to rotate in the other direction, the pawl member engages with the notch so that the one-way clutch is conditioned to be locked up.

FIG. 3 and FIG. 4 are views which illustrate one example of the conventional ratchet one-way clutch which is used for the stator of a torque converter. FIG. 3 is a sectional view on the front side, which shows the conventional ratchet one-way clutch. FIG. 4 is a sectional view taken in the axial direction in FIG. 3. The torque converter 51 comprises a runner 54 having the outer race portion 53 on the inner circumference; the inner race 52 which is arranged coaxially with the outer race portion 53 with the recessed portion 71 on the outer circumference; the pawl member 60 which is arranged for each of the pockets 65 provided on the inner circumference of the outer race portion 53 to transmit torque by being fitted into the recessed portion 71; the biasing member 61 which is installed on the hollow portion 66 provided for the pocket 65 to bias the pawl member 60 in the direction of the inner diameter; the bush 56 which supports the pawl member 60 and biasing member 61 in the axial direction and slidably moved on the inner race 52; and a snap spring 57 for preventing the bush 56 from falling off. For the biasing member 61, a corrugated spring is mainly used.

In this respect, each of recessed portions is arranged per designated pitch for the ratchet one-way clutch thus structured, and fitting is made after a slight idle rotation in the engaging direction. As a result, the torque which is loaded at the time of fitting becomes excessive instantaneously. Thus, there is a fear that hammering sounds are generated. Also, shocks are repeated at the time of fitting, which may result in making the life of the ratchet one-way clutch shorter.

SUMMARY OF THE INVENTION

It is an object of the present invention to provide a ratchet one-way clutch having a shock absorbing mechanism incorporated therein to absorb shocks at the time of fitting, being capable of preventing hammering sounds, while improving the life thereof.

In order to achieve the object described above, the ratchet one-way clutch of the present invention comprises an inner race provided with recessed portions on the outer circumference; an outer race member arranged coaxially with the inner race, being provided with pockets on the inner circumferential side; a pawl member arranged for each of the pockets to transmit torque by being fitted into each of the recessed portions; and a biasing member for biasing the pawl member in the inner diametral direction to promote the fitting. For this clutch, an operating element is provided to relatively rotate with respect to the outer race member, and an elastic member resides inclusively between the outer race member and the operating element.

Also, for the ratchet one-way clutch of the invention, extrusions are provided for the outer race member and the operating element, each of which is extended in the diametral direction, and when the end faces of the extrusions in the circumferential direction abut against each other, the range of the relative rotation is restricted.

Further, for the ratchet one-way clutch of the invention, the outer race member is provided with an extended portion that extends inwardly in the diametral direction, and then, the extended portion supports the pawl member and the biasing member in the axial, direction, while slidably moving with respect to the inner race.

For the present invention, the example, in which the ratchet one-way clutch is used for the stator of an automatic transmission, is shown as in the case of the prior art. With the provision of an operating element that relatively rotates with respect to the outer race member, an elastic member is arranged to reside inclusively between the outer race member and the operating element to make it a shock absorbing mechanism.

For the present embodiment, the portion of the runner on the inner circumferential side is made an operating element, and a coil spring is used as the elastic member. Also, the outer race member is structured with the outer race shown in the conventional example which is formed integrally with a bush.

DETAILED DESCRIPTION OF THE PREFERRED EMBODIMENTS

Hereinafter, with reference to the accompanying drawings, the embodiment will be described in detail in accordance with the present invention. Here, the same reference marks are applied to indicate the same parts in the accompanying drawings.

Figure 1:
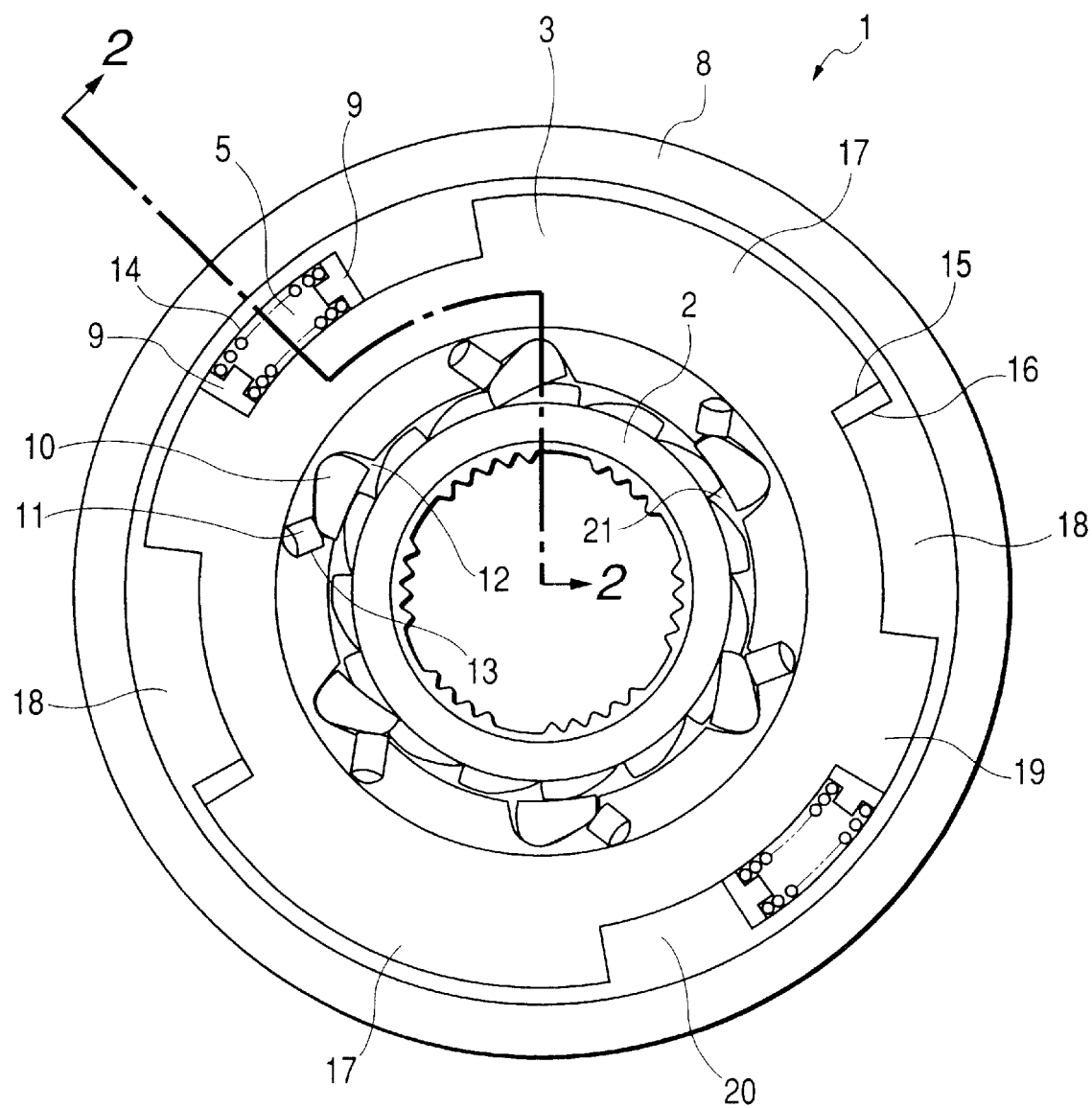
FIG. 1 is a sectional view on the front side, which shows a ratchet one-way clutch in accordance with one embodiment of the present invention. This is a cross-sectional view taken along line 1—1 in FIG. 2.
Figure 2:
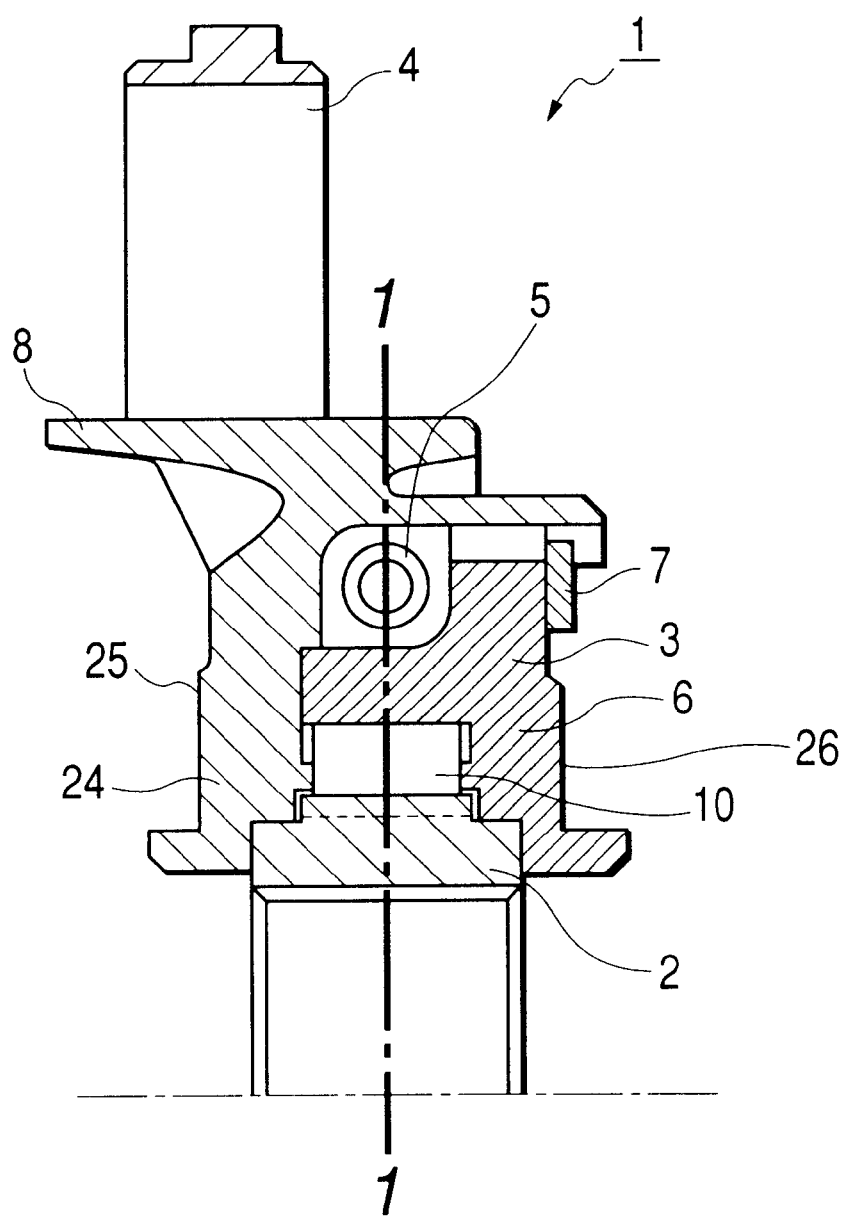
FIG. 2 is a cross-sectional view taken along line 2—2 in FIG. 1.
Figure 3:
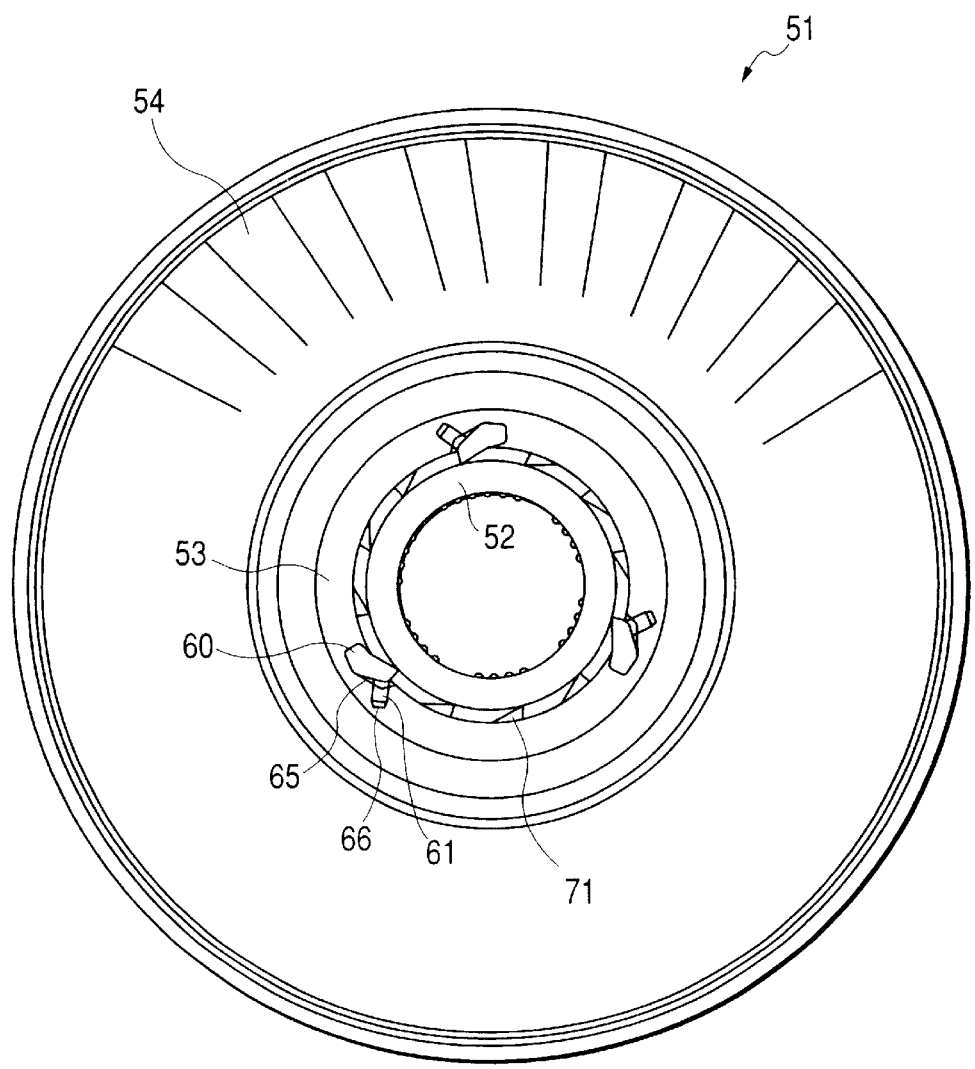
FIG. 3 is a sectional view on the front side, which shows a ratchet one-way clutch in accordance with the prior art.
Figure 4:
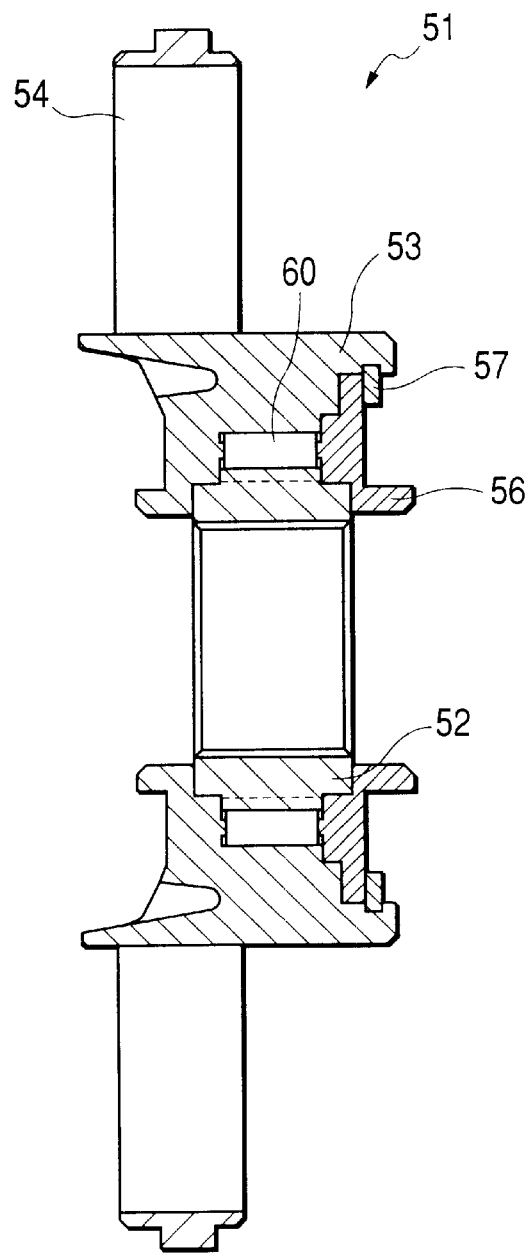
FIG. 4 is a cross-sectional view taken in the axial direction in FIG. 3.

FIG. 1 and FIG. 2 illustrate one embodiment of the present invention. FIG. 1 is a cross-sectional view taken along line 1—1 in FIG. 2, and FIG. 2 is a cross-sectional view taken along line 2—2 in FIG. 1. For the present embodiment, the ratchet one-way clutch is used for the stator of a torque converter (not shown).

As shown in FIG. 1, the stator 1 comprises an inner race 2 having recessed portion 21 on the outer circumference thereof; an outer race member 3 coaxially arranged with the inner race 2, having pockets 12 and hollow portions 13 on the inner circumference; the pawl member 10 which is arranged for each pocket 12 to be fitted into the recessed portion 21 to transmit torque; the biasing member 11 which is arranged for each hollow portion 13 to bias the pawl member 10 to the inner diameter side for promoting the pawl member 10 to be fitted into the recessed portion 21; the operating element 8 which relatively rotates with respect to the outer race member 3; a spring 5 arranged in a space 14 between the outer race member 3 and the operating element 8; and a sheet member 9 fixed to both ends of the spring 5.

On the outer circumference of the outer race member 3, a pair of extrusions 17 protruding outwardly in the diametral direction, which are arranged to face each other in the diametral direction. Also, on the inner circumference of the operating element 8 arranged outside the outer race member 3, extrusions 18 are arranged to face each other in the diametral direction. The end faces 15 and 16 of the extrusions 17 and 18 are arranged with a designated clearance.

Also, between the extrusions 17 of the outer race member 3, extrusions 19, each length of which is longer in the circumferential direction than that of the extrusion 17, are arranged in a pair to face each other in the diametral direction. Between the extrusions 18 of the operating element 8, extrusions 20, each length of which is shorter in the circumferential direction than that of the extrusion 18, are arranged in a pair to face each other in the diametral direction. The clearance between the end faces of the extrusions 19 and extrusions 20 becomes the space 14 described earlier. In this space 14, the spring 5 is inclusively installed between the sheet members 9.

Next, the description will be made of the operation of the shock absorbing mechanism in accordance with the present invention. Here, in FIG. 1, it is assumed that the inner race 2 is stationary for convenience' sake, and thought is given to the rotation on the outer race 3 side. When members on the outer race side, such as the outer race member 3, the operating element 8, are allowed to rotate in the right direction in FIG. 1, the status thereof is in the idle rotation. In the engaging direction, that is, when the rotation of the members on the outer race side in the left direction in FIG. 1, the pawl member 10 is fitted into the recessed portion 21 at first. Then, the pawl member 10 abuts against the inner wall of the pocket 12. Thus, torque is transmitted from the outer race member 3 to the spring 5.

At this juncture, torque is received between the spring 5 and the operating element 8 so as to compress the spring to be elastically deformed, thus absorbing shocks. When the elastic deformation of the spring 5 arrives at a designated amount, each of the end faces 15 and 16 of the extrusions 17 and 18 of the outer race member 3 and the operating element 8 abuts against each other to transmit torque to the operating element. Here, the operating element 8 is integrally formed with the runner on the inner circumference as described above. Therefore, torque is transmitted to the runner eventually.

Between the end face 15 and the end face 16, a designate clearance is provided, and the structure is arranged to enable the end face 15 and the end face 16 to abut against each other. As a result, the range of relative rotations is restricted for the outer race member 3 and the operating element 8. There is no possibility that the spring 5 is allowed to be elastically deformed beyond a designated amount, thus preventing the spring 5 from being settled.

As shown in FIG. 2, the outer race member 3 is provided integrally with the extended ring portion 6 which resides extendedly on the inner diametral side. The extended portion 6 supports the pawl member 10 and the biasing member 11 with the bushing function slidably movable on the outer circumference and side portion of the inner race 2. Also, for the stator 1, the side face 25 of the operating element 8, and the side face 26 of the outer race member 3 are arranged to be the receiving face of a needle bearing (not shown). With the outer race member 3 having the bush integrally provided therefor, there is no need for the provision of the bush which has been formed as a separate member, thus reducing the number of parts.

For the embodiment of the present invention described above, the numbers of extrusions for the outer race member 3 and the operating element 8 are not necessarily limited to those shown in FIG. 1. It is needless to mention that any other numbers can be provided. Also, the same is applicable to the number of the pawl members 10. Further, a coil spring is adopted as the spring 5, but if necessary, a spring of any other type is usable.

As described above, with the ratchet one-way clutch of the present invention, the following effects can be obtained:

The present invention makes it possible to absorb shocks when the pawl member is fitted, as also, to prevent hammering sounds from being generated.

Further, in accordance with the present invention, it becomes possible to prevent the elastic member from being settled and damaged.

Also, in accordance with the present invention, it is made easier to perform processing by curtailing the number of parts, as well as by adopting the die-casting process.

What is claimed is:

1. A ratchet one-way clutch comprising:

an inner race provided with recessed portions on the outer circumference;

an outer race member arranged coaxially with said inner race, being provided with pockets on the inner circumferential side;

a pawl member arranged for each of said pockets to transmit torque by being fitted into each of said recessed portions;

a biasing member for biasing said pawl member in the inner dianietral direction to promote said fitting;

an operating element arranged to rotate relative to said outer race member;

said operating element and said outer race member being provided with at least a first pair of mutually interdigitating projections, said projections having at least one pair of circumferentially facing mutually opposing faces; and an elastic member interposed between said pair of mutually opposing faces.

2. A ratchet one-way clutch according to claim 1, wherein said outer race member and said operating element are provided with a second pair of projections extending in the diametral direction, said projections having circumferentially facing mutually opposing faces positioned to restrict the range of said relative rotation by abutting against one another.

3. A ratchet one-way clutch according to claim 2, wherein said outer race member is provided with an extended portion extending inwardly in the diametral direction, and said extended portion supports said pawl member and said biasing member in the axial direction, while slidably moving with respect to said inner race.

4. A ratchet one-way clutch according to claim 1, wherein said outer race member is provided with an extended portion extending inwardly in the diametral direction, and said extended portion supports said pawl member and said biasing member in the axial direction, while slidably moving with respect to said inner race.

5. A ratchet one-way clutch according to claim 1, wherein said operating element has an inner periphery, said inner periphery being provided with a bearing surface for journaling said inner race.

6. In a torque converter having a one-way ratchet clutch, said clutch comprising:

an inner race provided with recessed portions on an outer circumference;

an outer race member arranged coaxially with said inner race, being provided with pockets on the inner circumferential side;

a pawl member arranged for each of said pockets to transmit torque by being fitted into each of said recessed portions; and a biasing member for biasing said pawl member in the inner diametral direction to promote said fitting, the improvement comprising:

an operating element arranged to rotate relative to said outer race member, and an elastic member located between said outer race member and said operating member.

* * * * *